United States Patent
Liu et al.

(10) Patent No.: US 11,804,991 B2
(45) Date of Patent: Oct. 31, 2023

(54) SEQUENCE DETECTION DEVICE USING PATH-SELECTIVE SEQUENCE DETECTION AND ASSOCIATED SEQUENCE DETECTION METHOD

(71) Applicant: MEDIATEK INC., Hsin-Chu (TW)

(72) Inventors: Yu-Ting Liu, Hsinchu (TW); Che-Yu Chiang, Hsinchu (TW); Deng-Fu Weng, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/892,178

(22) Filed: Aug. 22, 2022

(65) Prior Publication Data

US 2023/0118769 A1    Apr. 20, 2023

Related U.S. Application Data

(60) Provisional application No. 63/256,659, filed on Oct. 18, 2021.

(51) Int. Cl.
*H04L 25/03* (2006.01)

(52) U.S. Cl.
CPC .............................. *H04L 25/03057* (2013.01)

(58) Field of Classification Search
CPC .......... H03M 13/4107; H03M 13/4123; H04L 25/03006; H04L 25/03019; H04L 25/03025; H04L 25/03057; H04L 25/03878; H04L 25/03885; H04L 2025/0349
USPC ....... 375/232, 233, 262, 265, 341, 346, 348, 375/350, 353; 708/322, 323
See application file for complete search history.

(56) References Cited

U.S. PATENT DOCUMENTS

| | | | |
|---|---|---|---|
| 5,757,855 A * | 5/1998 | Strolle | H04L 25/03267 375/262 |
| 5,822,143 A | 10/1998 | Cloke | |
| 6,201,832 B1 * | 3/2001 | Choi | G11B 20/10046 375/232 |
| 7,266,146 B2 * | 9/2007 | Pare, Jr. | H04L 25/03292 375/232 |
| 8,098,725 B2 * | 1/2012 | Liu | H04N 21/426 375/233 |
| 9,674,012 B2 | 6/2017 | Ma | |
| 10,404,289 B1 | 9/2019 | Riani | |
| 10,425,257 B1 | 9/2019 | Shakiba | |
| 10,637,512 B2 | 4/2020 | Riani | |

(Continued)

FOREIGN PATENT DOCUMENTS

CN    101581734 A    11/2009

*Primary Examiner* — Young T. Tse
(74) *Attorney, Agent, or Firm* — Winston Hsu

(57) ABSTRACT

A sequence detection device includes a decision-feedback equalizer (DFE), a combining circuit, a decision circuit, and a sequence detection circuit. The DFE processes a symbol decision signal to generate a first equalized signal. The combining circuit combines a data signal and the first equalized signal to generate a sample signal. The decision circuit performs hard decision upon the sample signal to generate the symbol decision signal. The sequence detection circuit performs sequence detection upon the data signal to generate and output a symbol sequence. Regarding the sequence detection, the sequence detection circuit selects branches for branch metric calculation according to at least the symbol decision signal.

20 Claims, 9 Drawing Sheets

(56) References Cited

U.S. PATENT DOCUMENTS 11,038,538 B2    6/2021   Riani
2020/0044896 A1  2/2020   Chini

* cited by examiner

SEQUENCE DETECTION DEVICE USING PATH-SELECTIVE SEQUENCE DETECTION AND ASSOCIATED SEQUENCE DETECTION METHOD

CROSS REFERENCE TO RELATED APPLICATIONS

This application claims the benefit of U.S. Provisional Application No. 63/256,659, filed on Oct. 18, 2021. The content of the application is incorporated herein by reference.

BACKGROUND

The present invention relates to data communications, and more particularly, to a sequence detection device using path-selective sequence detection and an associated sequence detection method.

In high speed data communication systems, existing filtering and equalization schemes may not be enough to support challenging channels and next-generation Ethernet. For example, the detection of the received signal in a data communication system is challenging due to several factors such as noise, cross-talk, and inter-symbol interference (ISI). A typical feed-forward equalizer (FFE) can remove the pre-cursor ISI and the post-cursor ISI by using information from adjacent symbols. However, since the typical FFE does not use any noise-free estimated symbol (e.g., noise-free sliced symbols), the noise apart from ISI may be enhanced by the typical FFE. A typical decision-feedback equalizer (DFE) can remove the post-cursor ISI by using one or more noise-free estimated previous symbols (e.g., one or more noise-free sliced previous symbols). However, error propagation may be induced by the typical DFE due to the reliance on previous decision(s). Maximum likelihood sequence detection (MLSD), in addition, to the conventional FFE and DFE, is a commonly used technique which utilizes and further removes the ISI to deal with noise. However, MLSD has a higher level of implementation complexity and a higher level of power and memory consumption. Thus, there is a need for innovative low-complexity and power-efficient MLSD in a sequence detector.

SUMMARY

One of the objectives of the claimed invention is to provide a sequence detection device using path-selective sequence detection and an associated sequence detection method.

According to a first aspect of the present invention, an exemplary sequence detection device is disclosed. The exemplary sequence detection device includes a decision-feedback equalizer (DFE), a combining circuit, a decision circuit, and a sequence detection circuit. The DFE is configured to process a symbol decision signal to generate a first equalized signal. The combining circuit is configured to combine a data signal and the first equalized signal to generate a sample signal. The decision circuit is configured to perform hard decision upon the sample signal to generate the symbol decision signal. The sequence detection circuit is configured to perform sequence detection upon the data signal to generate and output a symbol sequence, wherein regarding the sequence detection, the sequence detection circuit is configured to select branches for branch metric calculation according to at least the symbol decision signal.

According to a second aspect of the present invention, an exemplary sequence detection method is disclosed. The exemplary sequence detection method includes: performing decision-feedback equalization upon a symbol decision signal to generate a first equalized signal; combining a data signal and the first equalized signal to generate a sample signal; performing hard decision upon the sample signal to generate the symbol decision signal; and performing sequence detection upon the data signal to generate and output a symbol sequence, wherein the sequence detection comprises: selecting branches for branch metric calculation according to at least the symbol decision signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a diagram illustrating trellis obtained by using all of the first branch reduction step, the second branch reduction step, and the third branch reduction step under different combinations of consecutive symbols in a 4-level PAM signaling and 1-tap DFE system.

FIG. 7 is a diagram illustrating trellis obtained by using all of the first branch reduction step, the second branch reduction step, the third branch reduction step, and the fourth branch reduction step under different combinations of consecutive symbols in a 4-level PAM signaling and 1-tap DFE system.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
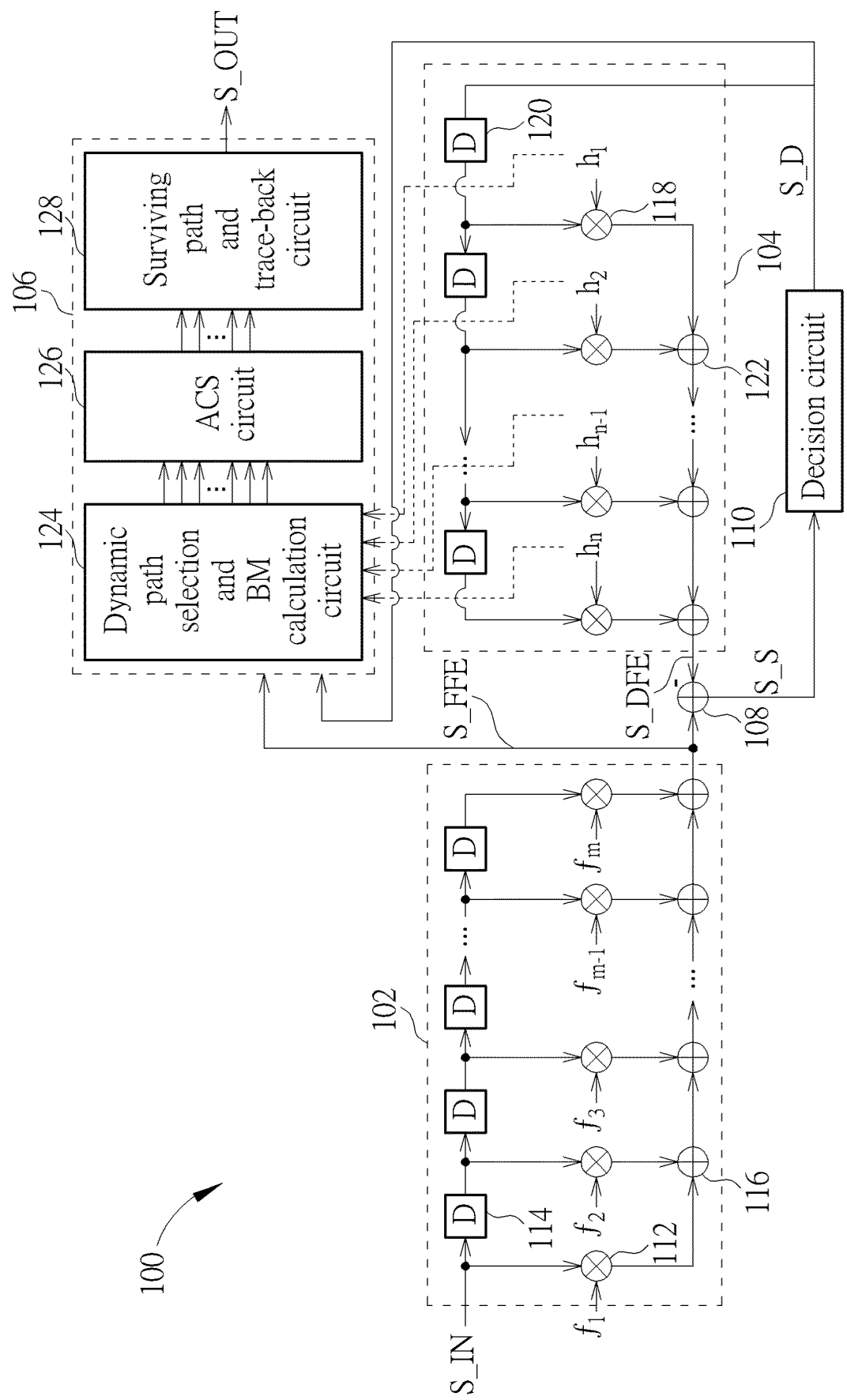
FIG. 1 is a diagram illustrating a sequence detection device using path-selective maximum likelihood sequence detection (MLSD) according to an embodiment of the present invention.

FIG. 1 is a diagram illustrating a sequence detection device using path-selective maximum likelihood sequence detection (MLSD) according to an embodiment of the present invention. The sequence detection device 100 may be a part of a receiver in a data communication system. In this embodiment, the sequence detection device 100 is a digital circuit, and includes a feed-forward equalizer (FFE) 102, a decision-feedback equalizer (DFE) 104, a sequence detection circuit 106, a combining circuit 108, and a decision circuit 110. The FFE 102 may be implemented by an m-tap FFE having m multipliers 112, (m−1) one-symbol delay elements 114, and (m−1) adders 116, where m FFE coefficients $f_1-f_m$ (m≥1) are applied to the m multipliers 112, respectively. However, this is for illustrative purposes only, and is not meant to be a limitation of the present invention. In practice, any suitable FFE structure may be employed by the FFE 102. That is, the present invention has no limitations on the FFE design. The FFE 102 is configured to process a received signal S_IN to generate an equalized signal S_FFE as a data signal to be processed by sequence detection (e.g., path-selective MLSD). For example, a pulse-amplitude modulation (PAM) signal is generated and transmitted from a transmitter of the data communication system to the receiver of the data communication system via a channel, and the received signal S_IN is a digital signal derived from the PAM signal. Taking 4-level PAM signaling for example, there are four symbols {−3, −1, +1, +3}, and each symbol corresponds to a pair of two bits. For example, four bit choices 00, 01, 11, and 10 may be associated with amplitudes of −3, −1, +1, and +3, respectively.

The DFE 104 is configured to process a symbol decision signal S_D to generate an equalized signal S_DFE. The DFE 104 may be implemented by an n-tap DFE having n multipliers 118, (n−1) one-symbol delay elements 120, and (n−1) adders 122, where n DFE coefficients $h_1-h_n$ (n≥1) are applied to the n multipliers 118, respectively. However, this is for illustrative purposes only, and is not meant to be a limitation of the present invention. In practice, any suitable DFE structure may be employed by the DFE 104. That is, the present invention has no limitations on the DFE design.

The combining circuit 108 is configured to combine the data signal (e.g., equalized signal S_FFE obtained from equalizing the received signal S_IN) and the equalized signal S_DFE to generate a sample signal S_S. For example, the combining circuit 108 may be implemented by a subtractor (which may be realized by an adder configured to perform subtraction), and may be used for subtracting the equalized signal S_DFE from the equalized signal S_FFE to generate the sample signal S_S. The decision circuit 110 is configured to perform hard decision upon the sample signal S_S to generate the symbol decision signal S_D. For example, the decision circuit 110 may be a slicer. In a case where the received signal S_IN is derived from 4-level PAM signaling, each of the equalized signals S_FFE, S_DFE and the sample signal S_S carries soft data, and the symbol decision signal S_D carries hard data (i.e., symbols each being decided by the slicer to be one of four symbols {−3, −1, +1, +3}).

The sequence detection circuit 106 is configured to perform sequence detection upon the data signal (e.g., equalized signal S_FFE) to generate and output a symbol sequence S_OUT. For 4-level PAM signaling, the symbol sequence S_OUT is a sequence of symbols each being decided by the sequence detection to be one of four symbols {−3, −1, +1, +3}. In this embodiment, the sequence detection circuit 106 is configured to employ the proposed path-selective MLSD. For example, regarding the sequence detection, the sequence detection circuit 106 is configured to select branches for branch metric (BM) calculation according to at least the symbol decision signal S_D. As shown in FIG. 1, the sequence detection circuit 106 includes a dynamic path selection and BM calculation circuit 124, an add-compare-select (ACS) circuit 126, and a surviving path and trace-back circuit 128. Regarding traditional MLSD in n-tap DFE receiver structure using M-level pulse amplitude modulation, it requires $M^{(n+1)}$ branch metric computations, where each branch metric includes a Euclidean distance (square) calculation. It suffers exponentially increasing computational complexity and power consumption as M or n increases. To address this issue, the dynamic path selection and BM calculation circuit 124 employs the proposed branch reduction technique for providing a power-and-memory-saving structure. Further details of the branch reduction will be described later with reference to the accompanying drawings. The ACS circuit 126 is used to deal with path metric (PM) accumulation. The surviving path and trace-back circuit 126 is used to employ a trace-back approach to identify a sequence of symbols according to surviving paths provided by the ACS circuit 126. It should be noted that an input of the dynamic path selection and BM calculation circuit 124 is the equalized signal S_FFE. Hence, BM calculation design and PM accumulation design employed by the sequence detection circuit 106 are the same as that employed by a typical sequence detector. Like the typical sequence detector using the traditional MLSD, the sequence detection circuit 106 using the proposed path-selective MLSD is configured to trace back surviving paths directly to output the symbol sequence S_OUT. Since the symbol sequence S_OUT output from the sequence detection circuit 106 is a sequence of symbols directly, no further processing is needed to transform an output of the sequence detection circuit 106 into a sequence of symbols.

Since the present invention is focused on the proposed branch reduction technique employed by the dynamic path selection and BM calculation circuit 124 and a person skilled in the art should readily understand principles of the rest of operations performed by the sequence detection circuit 106, further description of the rest of operations performed by the sequence detection circuit 106 is omitted here for brevity.

The proposed branch reduction is realized by relying on the symbol decision signal (e.g., slicer decisions) S_D to select dominant branches and unselect/neglect inessential branches. Based on the symbol decision signal (e.g., slicer decisions) S_D, some of the branches whose corresponding probabilities are extremely low can be removed. For better comprehension of the proposed branch reduction scheme, the following assumes that the received signal S_IN is derived from 4-level PAM signaling in additive white Gaussian noise (AWGN) channel, the DFE 104 is implemented by a 1-tap DFE with $h_1=0.5$ (worst case), and the signal-to-noise ratio (SNR) is 18 dB.

Figure 2:
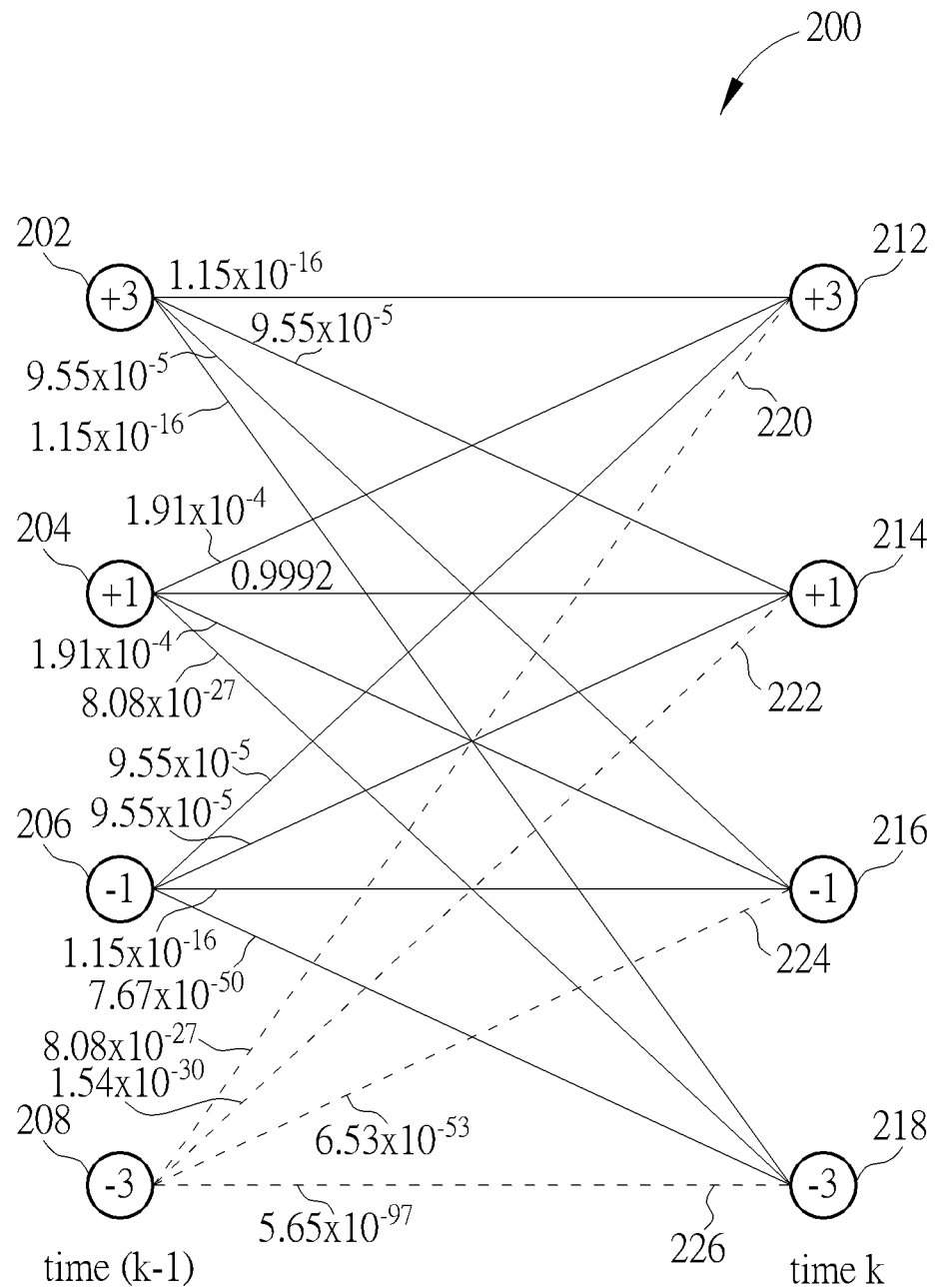
FIG. 2 is a diagram illustrating the trellis resulting from a first branch reduction step according to an embodiment of the present invention.

FIG. 2 is a diagram illustrating the trellis 200 resulting from a first branch reduction step according to an embodiment of the present invention. In accordance with the 4-level PAM signaling, the original trellis should have four preceding states 202, 204, 206, 208 at the preceding time instant (k−1) and four succeeding states 212, 214, 216, 218 at the succeeding time instant k. The preceding states 202, 204, 206, 208 correspond to symbols +3, +1, −1, −3, respectively. The succeeding states 212, 214, 216, 218 correspond to symbols +3, +1, −1, −3, respectively. The probability of each branch from one preceding state to one succeeding stage is illustrated in FIG. 2. For example, regarding 4-level PAM signaling in AWGN channel and SNR=18 dB, the transition +1→−1/+3 has probability $1.91 \times 10^{-4}$ while the transition +1→−3 has the probability $8.08 \times 10^{-27}$.

Assume that the symbol decision signal S_D has consecutive symbols, including a first symbol $d_{k-1}$ ($d_{k-1}$=+1) corresponding to the preceding state 204 of trellis at the preceding time instant (k−1) and a second symbol $d_k$ ($d_k$=+1) corresponding to the succeeding state 214 of trellis at the succeeding time instant k. Regarding BM calculation of branches between states of trellis at the preceding time instant (k−1) and the succeeding time instant k, the sequence detection circuit 106 (particularly, dynamic path selection and BM calculation circuit 124 of sequence detection circuit 106) is configured to refer to the first symbol $d_{k-1}$ to unselect specific branches that start from another preceding state of trellis at the preceding time instant (k−1). As shown in FIG. 2, branches 220, 222, 224, 226 starting from the preceding state 208 that is not adjacent to the preceding state 204 (which corresponds to the first symbol $d_{k-1}$) have extremely low probabilities. Hence, the first branch reduction step may remove all branches that start from the preceding state 208 at the preceding time instant (k−1) to generate the trellis 200 with a reduced number of branches.

Figure 3:
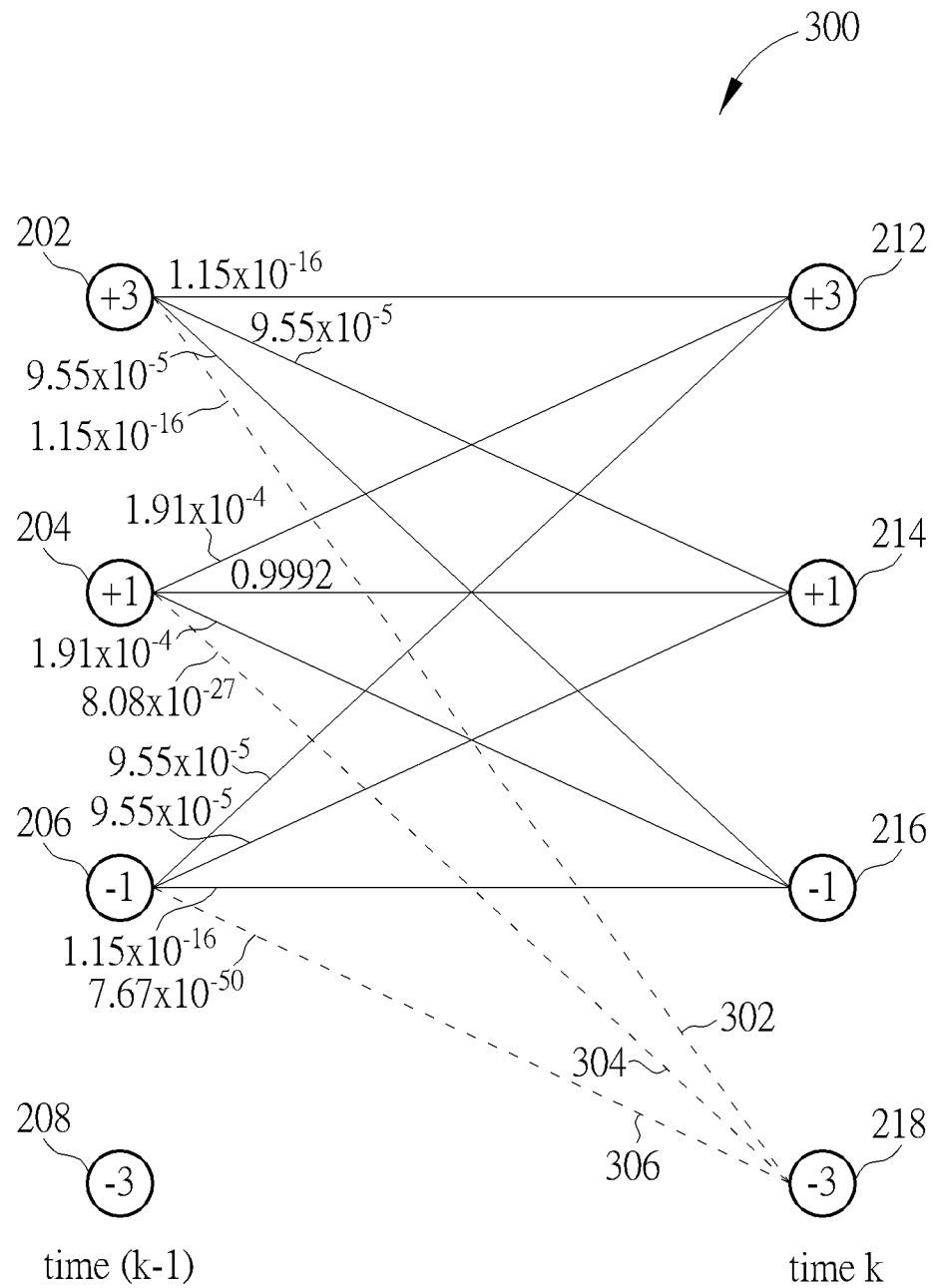
FIG. 3 is a diagram illustrating the trellis resulting from a second branch reduction step according to an embodiment of the present invention.

FIG. 3 is a diagram illustrating the trellis 300 resulting from a second branch reduction step according to an embodiment of the present invention. The trellis 200 shown in FIG. 2 can be further processed for branch reduction. Regarding BM calculation of branches between states of trellis at the preceding time instant (k−1) and the succeeding time instant k, the sequence detection circuit 106 (particularly, dynamic path selection and BM calculation circuit 124 of sequence detection circuit 106) is configured to refer to the second symbol $d_k$ to unselect specific branches that start from another succeeding state of trellis at the succeeding time instant k. As shown in FIG. 3, branches 302, 304, 306 ending at the succeeding state 218 that is not adjacent to the succeeding state 214 (which corresponds to the second symbol $d_k$) have extremely low probabilities. Hence, the second branch reduction step may remove all branches that end at the succeeding state 218 at the succeeding time instant k to generate the trellis 300 with a reduced number of branches.

Figure 4:
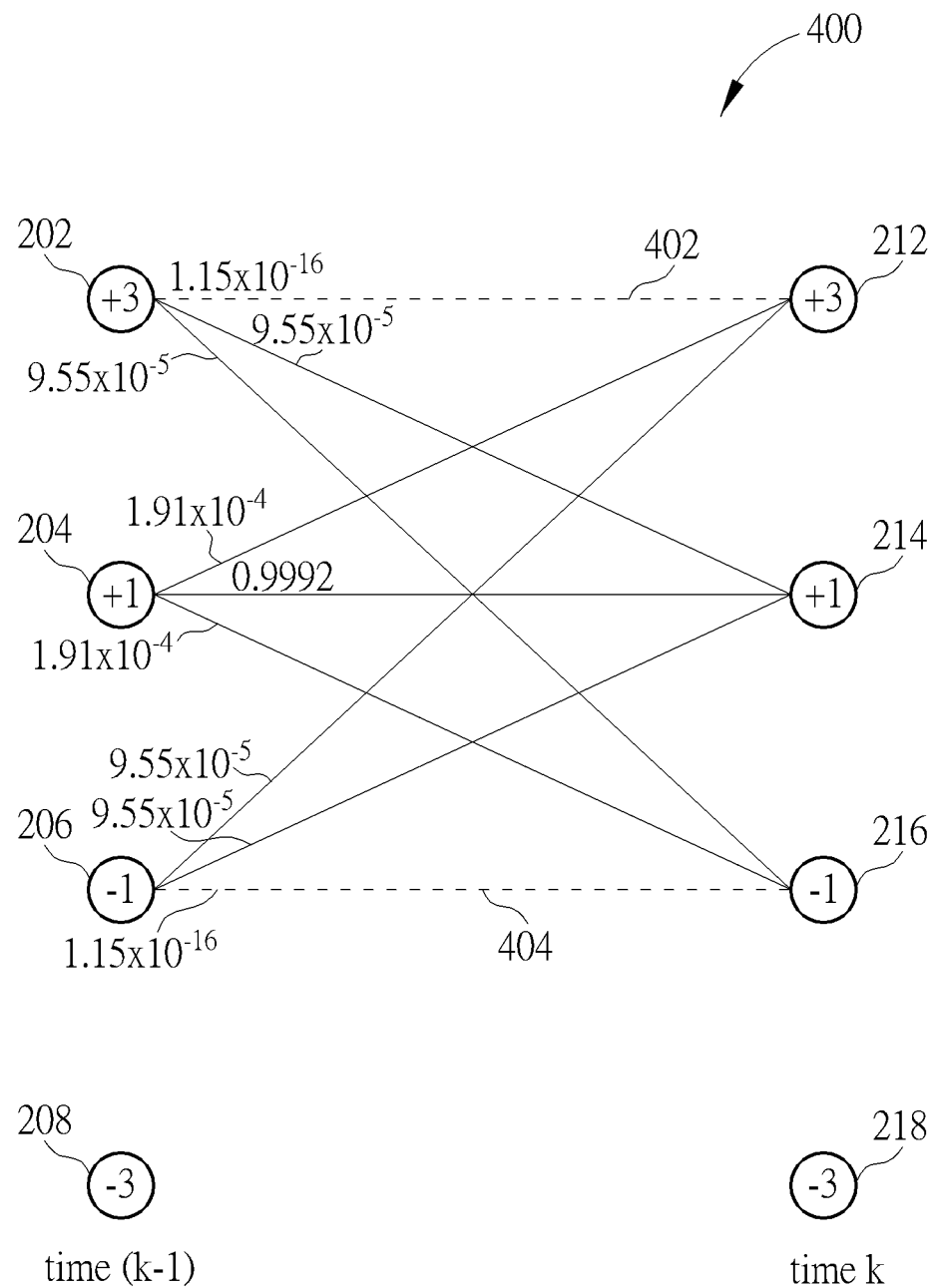
FIG. 4 is a diagram illustrating the trellis resulting from a third branch reduction step according to an embodiment of the present invention.

FIG. 4 is a diagram illustrating the trellis 400 resulting from a third branch reduction step according to an embodiment of the present invention. The trellis 300 shown in FIG. 3 can be further processed for branch reduction. Since DFE produces specific error patterns, branches corresponding to non-existing error patterns can be further removed. Taking 4-level PAM signaling and 1-tap DFE system for example, errors should be alternating. If the hard data $\{d_{k-1}, d_k\}$ is $\{+1, +1\}$, there should be no $\{−1, −1\}$ and $\{+3, +3\}$ branches since none of the error patterns $\{−2, −2\}$ and $\{+2, +2\}$ is alternating. Instead, $\{−1, +3\}$, $\{−1, +1\}$, $\{+3, −1\}$, and $\{+3, +1\}$ are possible branches. Hence, regarding BM calculation of branches between states of trellis at the preceding time instant (k−1) and the succeeding time instant k, the sequence detection circuit 106 (particularly, dynamic path selection and BM calculation circuit 124 of sequence detection circuit 106) is configured to refer to both of the first symbol $d_{k-1}$ ($d_{k-1}$=+1) and the second symbol $d_k$ ($d_k$=+1) to unselect at least one specific branch that corresponds to at least one non-existing error pattern of the DFE 104. The third branch reduction step removes one branch 402 that starts from the preceding state 202 and ends at the succeeding state 212, and further removes another branch 404 that starts from the preceding state 206 and ends at the succeeding state 216, to generate the trellis 400 with a reduced number of branches.

Figure 5:
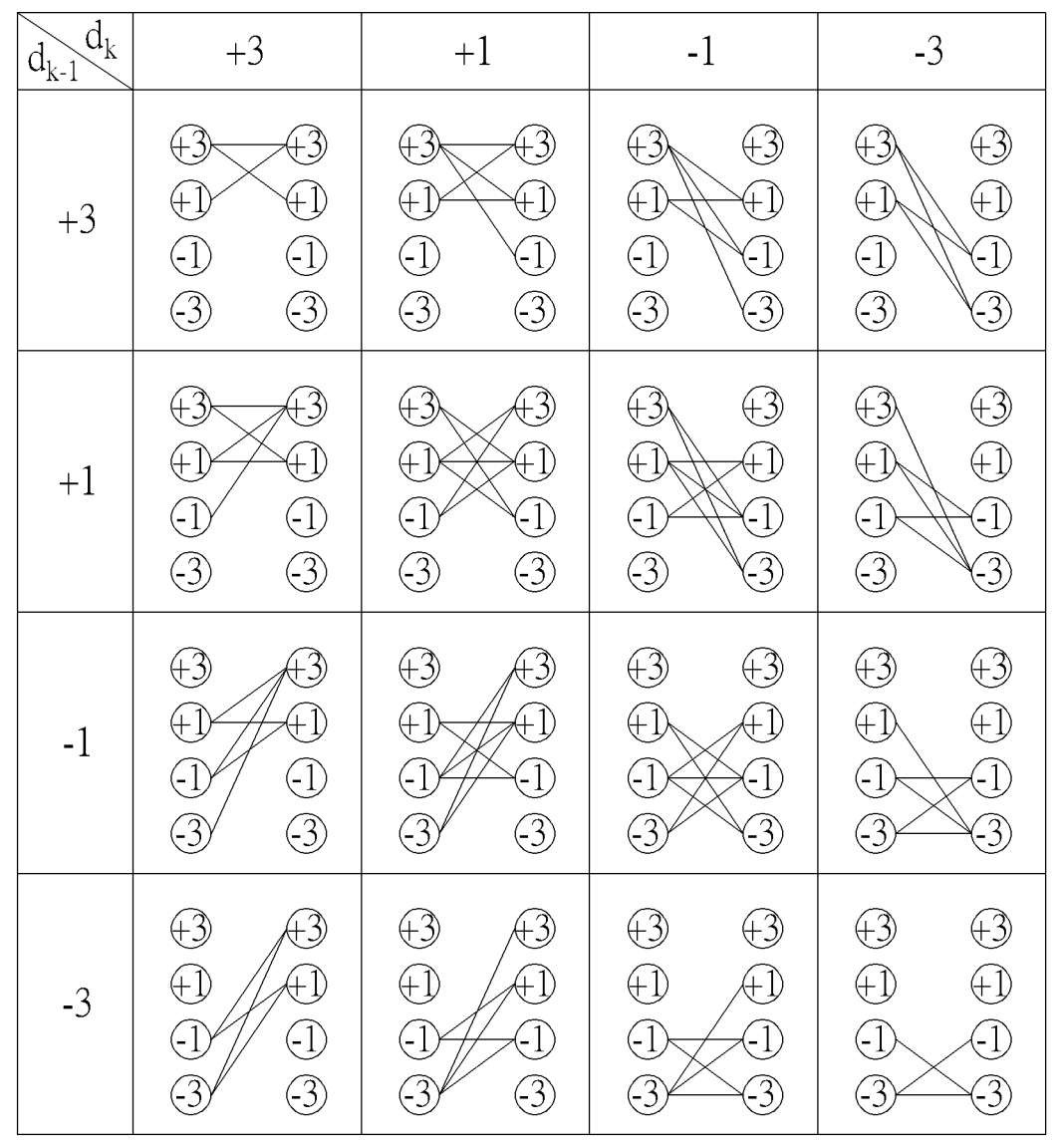

FIG. 5 is a diagram illustrating trellis obtained by using all of the first branch reduction step, the second branch reduction step, and the third branch reduction step under different combinations of consecutive symbols $\{d_{k-1}, d_k\}$ in a 4-level PAM signaling and 1-tap DFE system. Compared to the traditional MLSD in 1-tap DFE receiver structure using 4-level PAM that requires $4^2$ branch metric computations, the proposed path-selective MLSD requires a smaller number of branch metric computations due to branch reduction.

As mentioned above, the symbol decision signal S_D provides hard data that can be referenced by the sequence detection circuit 106 (particularly, dynamic path selection and BM calculation circuit 124 of sequence detection circuit 106) for branch reduction. However, this is for illustrative purposes only, and is not meant to be a limitation of the present invention. In some embodiments of the present invention, additional signal(s) may also be referenced by the sequence detection circuit 106 (particularly, dynamic path selection and BM calculation circuit 124 of sequence detection circuit 106) for branch reduction. For example, the sequence detection circuit 106 (particularly, dynamic path selection and BM calculation circuit 124 of sequence detection circuit 106) is configured to select branches for branch metric calculation according to the symbol decision signal S_D (which carries hard data output from the decision circuit 110) and the sample signal S_S (which carries soft data to be processed by the decision circuit 110). In addition to the aforementioned first branch reduction step, second branch reduction step, and third branch reduction step that rely on the symbol decision signal S_D, the sequence detection circuit 106 (particularly, dynamic path selection and BM calculation circuit 124 of sequence detection circuit 106) can perform a fourth branch reduction step that relies on both of the symbol decision signal S_D and the sample signal S_S.

Figure 6:
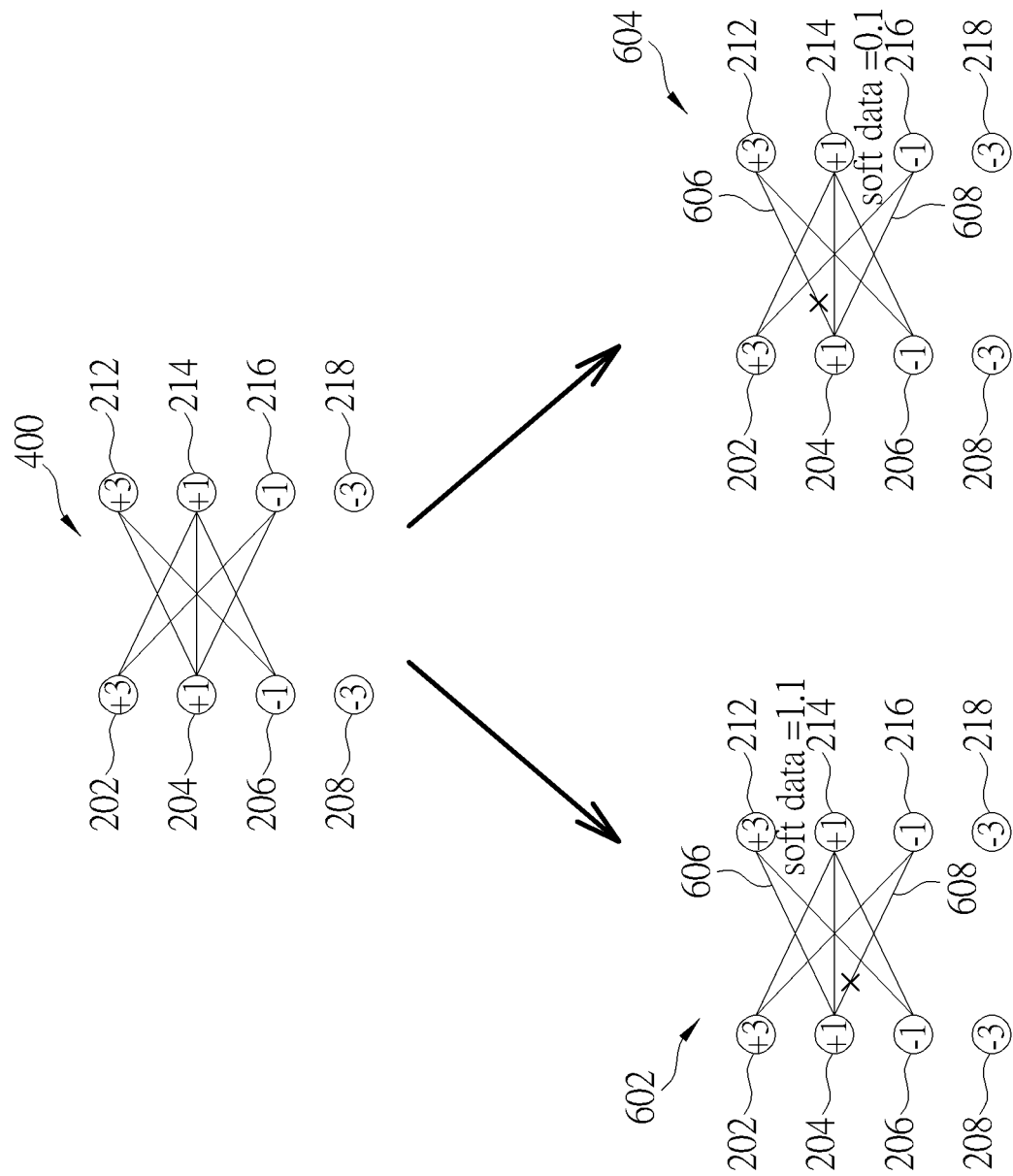
FIG. 6 is a diagram illustrating the trellis resulting from a fourth branch reduction step according to an embodiment of the present invention.

FIG. 6 is a diagram illustrating the trellis 602/604 resulting from a fourth branch reduction step according to an embodiment of the present invention. The trellis 400 shown in FIG. 4 can be further processed for branch reduction. The symbol decision signal S_D has consecutive symbols, including the first symbol (hard data) $d_{k-1}$ ($d_{k-1}$=+1) corresponding to the preceding state 204 of trellis at the preceding time instant (k−1) and the second symbol (hard data) $d_k$ ($d_k$=+1) corresponding to the succeeding state 214 of trellis at the succeeding time instant k. The sample signal S_S has a sample (soft data) $s_k$ from which the second symbol $d_k$ ($d_k$=+1) is decided by the decision circuit (e.g., slicer) 110. Regarding BM calculation of branches between states of trellis at the preceding time instant (k−1) and the succeeding time instant k, the sequence detection circuit 106 (particularly, dynamic path selection and BM calculation circuit 124 of sequence detection circuit 106) is configured to refer to the sample (soft data) $s_k$ and the associated second symbol (hard data) $d_k$ to unselect a specific branch that starts from the preceding state 204 (which corresponds to the first symbol $d_{k-1}$) to another succeeding state of trellis at the succeeding time instant k. In a case where the sample $s_k$ (e.g., $s_k$=1.1) is larger than the second symbol $d_k$ ($d_k$=+1), the branch 608 (which starts from the preceding state 204 and ends at the succeeding state 216 adjacent to the succeeding state 214 and corresponding to a symbol $\{−1\}$ smaller than the second symbol $d_k$) can be removed. In another case where the sample $s_k$ (e.g., $s_k$=0.1) is smaller than the second symbol $d_k$ ($d_k$=+1), the branch 606 (which starts from the preceding state 204 and ends at the succeeding state 212 adjacent to the succeeding state 214 and corresponding to a symbol {+3} larger than the second symbol $d_k$) can be removed.

Figure 7:
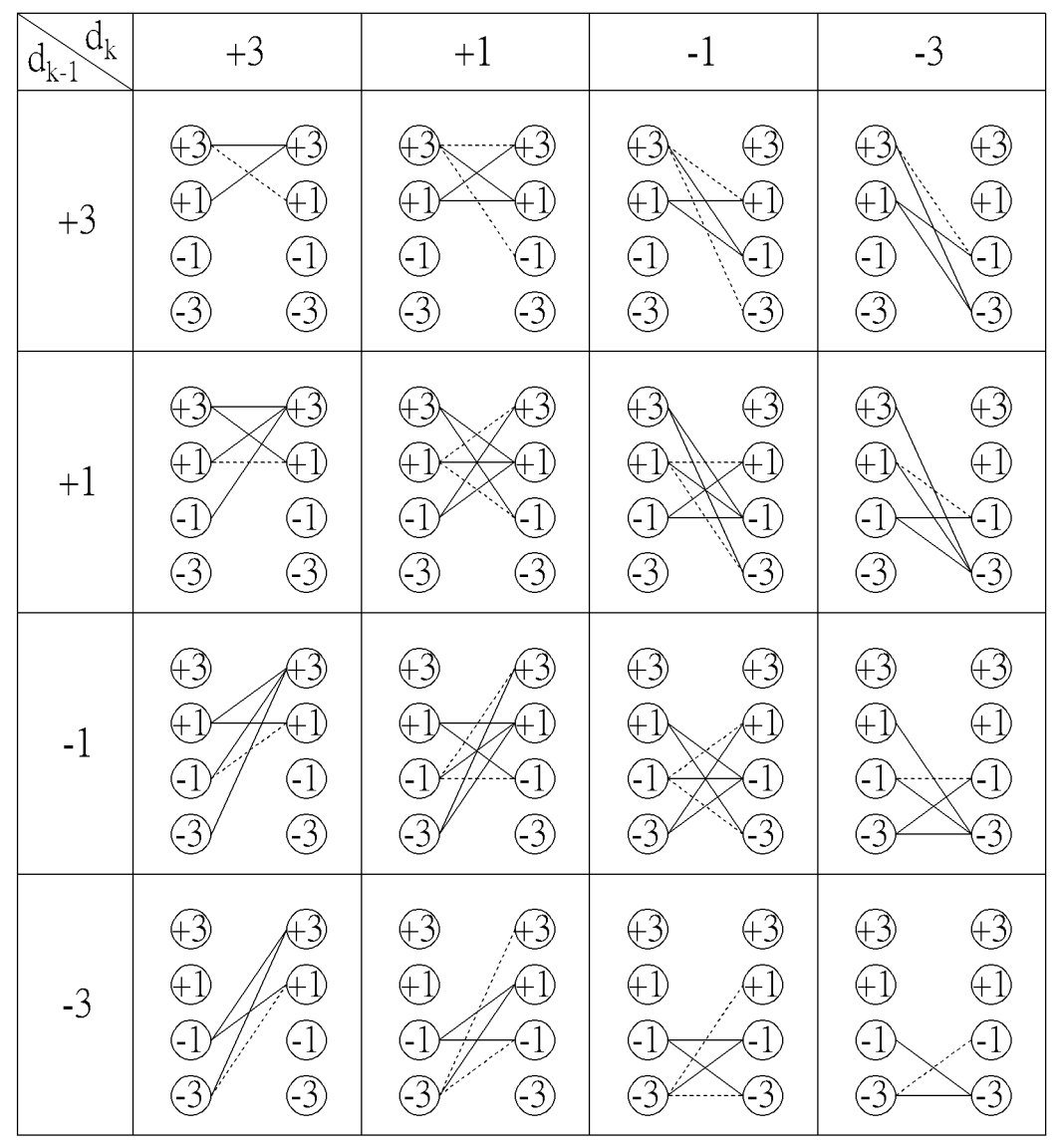

FIG. 7 is a diagram illustrating trellis obtained by using all of the first branch reduction step, the second branch reduction step, the third branch reduction step, and the fourth branch reduction step under different combinations of consecutive symbols $\{d_{k-1}, d_k\}$ in a 4-level PAM signaling and 1-tap DFE system. One dashed line shown in FIG. 7 indicates one candidate branch that may be removed by the fourth branch reduction step. Compared to the traditional MLSD in 1-tap DFE receiver structure using 4-level PAM that requires $4^2$ branch metric computations, the proposed path-selective MLSD requires a smaller number of branch metric computations due to branch reduction. Specifically, in an M-level PAM signaling with 1-tap DFE system, the conventional MLSD requires $M^2$ branch metric calculations for each timing stage associated with one preceding time (k−1) and one succeeding time k, and the proposed-select MLSD requires an average of $$\left(6 - \frac{7}{M} + \frac{2}{M^2}\right)$$

branch metric calculations for each timing stage associated with one preceding time (k−1) and one succeeding time k, where $$6 - \frac{7}{M} + \frac{2}{M^2} < M^2.$$

The proposed path-selective MLSD can achieve the same performance as conventional MLSD. The power and area requirements of the proposed path-selective MLSD can be reduced since they are positively correlated with the number of branches used. As shown in FIG. 7, the trellis of the sequence detection circuit 106 may include either two or three preceding states only, and may include either two or three succeeding states only. Hence, the ACS circuit 126 is allowed to employ 3-to-1 comparator(s) and/or 2-to-1 comparator(s), where the 3-to-1 comparator/2-to-1 comparator has a smaller comparator size compared to a 4-to-1 comparator. Furthermore, the trellis of the sequence detection circuit 106 may include N branches, where N is a positive integer not smaller than 2 and not larger than 6. Since the number of branches is smaller, the computational complexity and power consumption of BM calculation can be reduced.

It should be noted that the aforementioned first branch reduction step, second branch reduction step, the third branch reduction step, and fourth third branch reduction step are not required to be executed in order. In practice, the order of first branch reduction step, second branch reduction step, the third branch reduction step, and fourth third branch reduction step may be changed, depending upon actual design considerations. These alternative designs all fall within the scope of the present invention.

Figure 8:
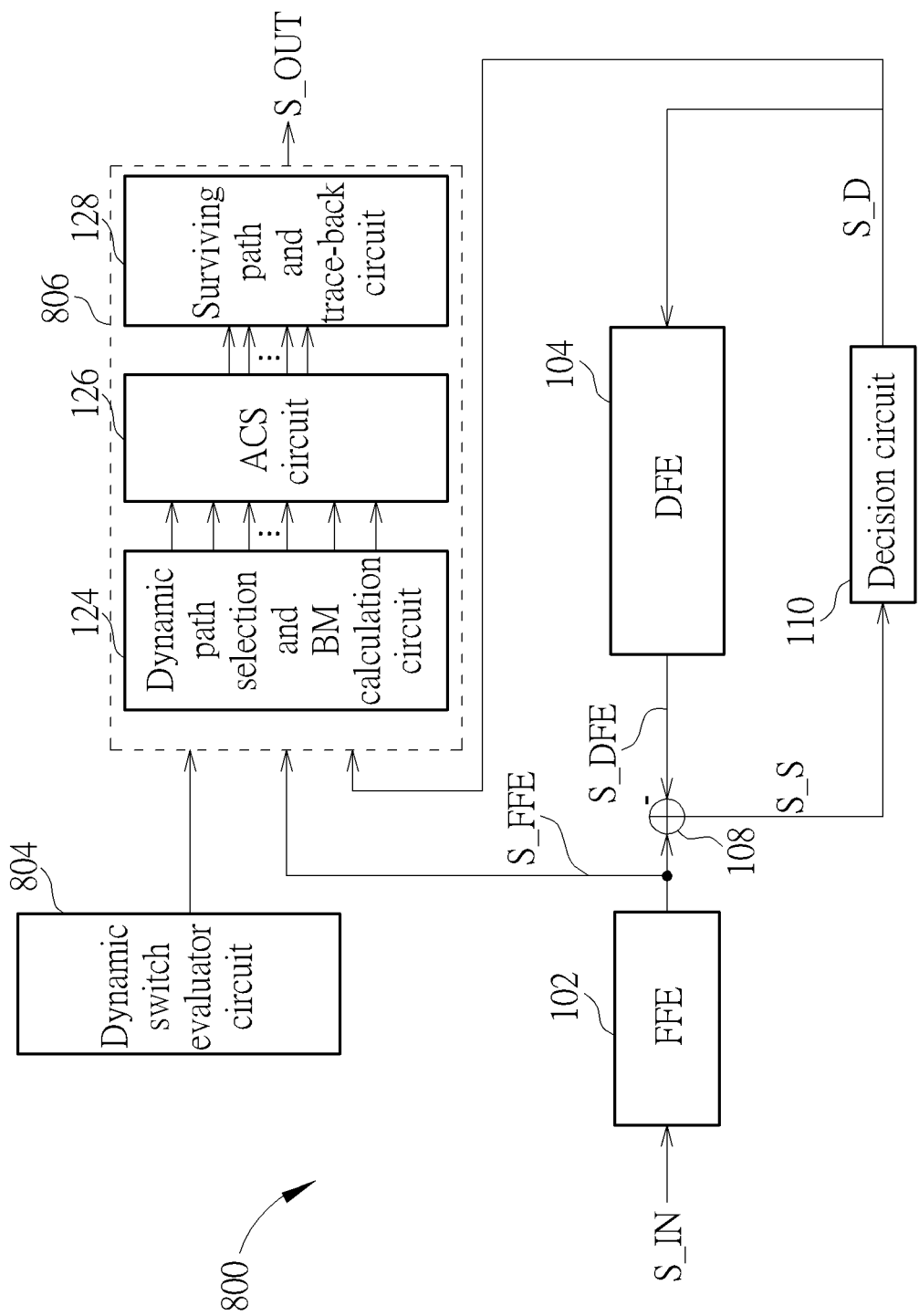
FIG. 8 is a diagram illustrating a sequence detection device using path-selective MLSD with dynamic switch according to an embodiment of the present invention.

If the proposed path-selective MLSD is not always in operation and is activated only during certain periods, its power requirement can be further reduced. The present invention further proposes path-selective MLSD with dynamic switch. FIG. 8 is a diagram illustrating a sequence detection device using path-selective MLSD with dynamic switch according to an embodiment of the present invention. The sequence detection device 800 may be a part of a receiver in a data communication system, and may be a digital circuit. The major difference between the sequence detection devices 100 and 800 is that the sequence detection device 800 further includes a dynamic switch evaluator circuit 804. The dynamic switch evaluator circuit 804 is configured to control activation of the sequence detection circuit 806. If the sequence detection circuit 806 is activated by the dynamic switch evaluator circuit 804, the symbol sequence S_OUT is derived from path-selective MLSD performed upon the equalized signal S_FFE. If the sequence detection circuit 806 is deactivated by the dynamic switch evaluator circuit 804, the sequence detection circuit 806 may bypass the symbol decision signal S_D as the symbol sequence S_OUT.

The proposed path-selective MLSD with dynamic switch can achieve the same performance as always-on conventional MLSD. Specifically, the dynamically switched path-selective MLSD reduces the power consumption greatly, and has negligible performance loss.

Figure 9:
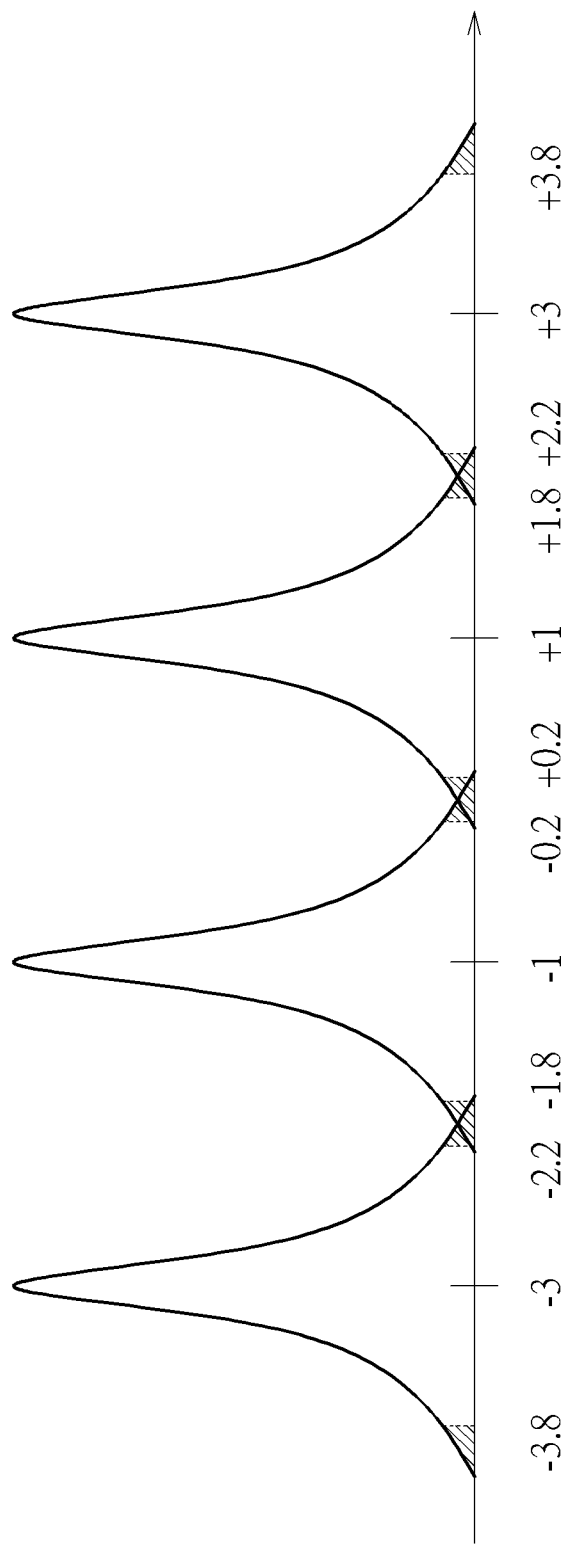
FIG. 9 is a diagram illustrating distribution of samples that are transmitted via an AWGN channel.

In one exemplary design, the dynamic switch evaluator circuit 804 is configured to control activation of the sequence detection circuit 806 according to difference between the sample signal S_S and the symbol decision signal S_D. The sample signal S_S may carry one sample (soft data) $s_i$ for each time instant i, and the decision circuit 110 may perform hard decision upon the sample $s_i$ to generate one symbol (hard data) $d_i$ for the same time instant i. For example, the dynamic switch evaluator circuit 804 may compare an absolute difference between the sample $s_i$ and the symbol $d_i$ with a threshold TH to determine whether to activate or deactivate the sequence detection circuit 806. When the absolute difference $|s_i-d_i|$ is larger than the threshold TH, it implies that the sequence detection device 800 is operating under high error probability. Hence, the dynamic switch evaluator circuit 804 may activate the sequence detection circuit 806 for generating the symbol sequence S_OUT through path-selective MLSD. When the absolute difference $|s_i-d_i|$ is not larger than the threshold TH, it implies that the sequence detection device 800 is operating under low error probability. Hence, the dynamic switch evaluator circuit 804 may deactivate the sequence detection circuit 806 for power consumption reduction and memory usage reduction. FIG. 9 is a diagram illustrating distribution of samples that are transmitted via an AWGN channel. For an AWGN channel, there exists one-to-one mapping between activation probability of sequence detection circuit 806 and the threshold TH. For example, assuming that the threshold TH is set by 0.8, the path-selective MLSD should be activated if there exists soft data that lies in the shaded regions due to $|s_i-d_i|>0.8$. To put it simply, the proposed path-selective MLSD with dynamic switch is capable of jointly optimizing the receiver performance and the power efficiency.

In another exemplary design, the dynamic switch evaluator circuit 804 is configured to control activation of the sequence detection circuit 806 according to one or more channel properties. For example, when the sequence detection device 800 is operating under poor channel properties, the dynamic switch evaluator circuit 804 may activate the sequence detection circuit 806; and when the sequence detection device 800 is operating under good channel properties, the dynamic switch evaluator circuit 804 may deactivate the sequence detection circuit 806.

In yet another exemplary design, the dynamic switch evaluator circuit 804 is configured to control activation of the sequence detection circuit 806 according to an FFE coefficient setting (e.g., FFE coefficients $f_1$-$f_m$ shown in FIG. 1) or a DFE coefficient setting (e.g., DFE coefficients $h_1$-$h_n$ shown in FIG. 1). The FFE/DFE coefficient setting may affect the number of braches unselected by the branch reduction performed at the dynamic path and BM calculation circuit 124. For example, activation of the aforementioned fourth branch reduction step for removing one additional branch may depend on the FFE/DFE coefficient setting. Hence, the dynamic switch evaluator circuit 804 may dynamically activate the sequence detection circuit 806 in response to the FFE/DFE coefficient setting that may be adaptively adjusted.

Since MLSD is based on Viterbi algorithm, the proposed path-selective MLSD is equipped with error-correction capability. Regarding the sequence detection device 800, the dynamically activated path-selective MLSD is a power-efficient function which provides an adjustable capability of error-correction and can achieve the performance of ideal MLSD in a best-case scenario.

It should be noted that the FFE 102 may be optional. For example, in some embodiments, the sequence detection device 100 shown in FIG. 1 may be modified to omit the FFE 102, such that the received signal S_IN may act as the aforementioned data signal fed into the sequence detection circuit 106 and the combining circuit 108. For another example, in some embodiments, the sequence detection device 800 shown in FIG. 8 may be modified to omit the FFE 102, such that the received signal S_IN may act as the aforementioned data signal fed into the sequence detection circuit 806 and the combining circuit 108. These alternative designs all fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sequence detection device comprising:
   a decision-feedback equalizer (DFE), configured to process a symbol decision signal to generate a first equalized signal;
   a combining circuit, configured to combine a data signal and the first equalized signal to generate a sample signal;
   a decision circuit, configured to perform hard decision upon the sample signal to generate the symbol decision signal; and
   a sequence detection circuit, configured to perform sequence detection upon the data signal to generate and output a symbol sequence, wherein regarding the sequence detection, the sequence detection circuit is configured to select branches for branch metric calculation according to at least the symbol decision signal.

2. The sequence detection device of claim 1, further comprising:
   a feed-forward equalizer (FFE), configured to process a received signal to generate a second equalized signal as the data signal.

3. The sequence detection device of claim 1, wherein the symbol decision signal comprises consecutive symbols, the consecutive symbols comprise a first symbol corresponding to one preceding state of trellis at a preceding time instant and a second symbol corresponding to one succeeding state of trellis at a succeeding time instant, and regarding branch metric calculation of branches between states of trellis at the preceding time instant and the succeeding time instant, the sequence detection circuit is configured to refer to the first symbol to unselect specific branches that start from another preceding state of trellis at the preceding time instant.

4. The sequence detection device of claim 1, wherein the symbol decision signal comprises consecutive symbols, the consecutive symbols comprise a first symbol corresponding to one preceding state of trellis at a preceding time instant and a second symbol corresponding to one succeeding state of trellis at a succeeding time instant, and regarding branch metric calculation of branches between states of trellis at the preceding time instant and the succeeding time instant, the sequence detection circuit is configured to refer to the second symbol to unselect specific branches that end at another succeeding state of trellis at the succeeding time instant.

5. The sequence detection device of claim 1, wherein the symbol decision signal comprises consecutive symbols, the consecutive symbols comprise a first symbol corresponding to one preceding state of trellis at a preceding time instant and a second symbol corresponding to one succeeding state of trellis at a succeeding time instant, and regarding branch metric calculation of branches between states of trellis at the preceding time instant and the succeeding time instant, the sequence detection circuit is configured to refer to both of the first symbol and the second symbol to unselect at least one specific branch that corresponds to at least one non-existing error pattern of the DFE.

6. The sequence detection device of claim 1, wherein the sequence detection circuit is configured to select the branches for branch metric calculation according to the symbol decision signal and the sample signal.

7. The sequence detection device of claim 6, wherein the symbol decision signal comprises consecutive symbols, the consecutive symbols comprise a first symbol corresponding to one preceding state of trellis at a preceding time instant and a second symbol corresponding to one succeeding state of trellis at a succeeding time instant, the sample signal comprises a sample at the succeeding time instant, the decision circuit performs hard decision upon the sample to decide the second symbol, and regarding branch metric calculation of branches between states of trellis at the preceding time instant and the succeeding time instant, the sequence detection circuit is configured to refer to the sample and the second symbol to unselect a specific branch that starts from said one preceding state of trellis at the preceding time instant to another succeeding state of trellis at the succeeding time instant.

8. The sequence detection device of claim 1, wherein the received signal is derived from a pulse amplitude modulation (PAM) signal.

9. The sequence detection device of claim 1, wherein the sequence detection circuit is configured to trace back surviving paths directly to output the symbol sequence.

10. The sequence detection device of claim 1, wherein trellis of the sequence detection circuit comprises either two or three preceding states only.

11. The sequence detection device of claim 1, wherein trellis of the sequence detection circuit comprises either two or three succeeding states only.

12. The sequence detection device of claim 1, wherein trellis of the sequence detection circuit comprises N branches, and N is a positive integer not smaller than 2 and not larger than 6.

13. The sequence detection device of claim 1, further comprising:

an evaluator circuit, configured to control activation of the sequence detection circuit.

14. The sequence detection device of claim 13, wherein the evaluator circuit is configured to control the activation of the sequence detection circuit according to a difference between the sample signal and the symbol decision signal.

15. The sequence detection device of claim 13, wherein the evaluator circuit is configured to control the activation of the sequence detection circuit according to one or more channel properties.

16. The sequence detection device of claim 13, wherein the evaluator circuit is configured to control the activation of the sequence detection circuit according to an FFE coefficient setting or a DFE coefficient setting.

17. The sequence detection device of claim 13, wherein the evaluator circuit dynamically activates the sequence detection circuit to provide an adjustable capability of error-correction.

18. A sequence detection method comprising:

performing decision-feedback equalization upon a symbol decision signal to generate a first equalized signal;

combining a data signal and the first equalized signal to generate a sample signal;

performing hard decision upon the sample signal to generate the symbol decision signal; and performing sequence detection upon the data signal to generate and output a symbol sequence, wherein the sequence detection comprises:

selecting branches for branch metric calculation according to at least the symbol decision signal.

19. The sequence detection method of claim 18, further comprising:

performing feed-forward equalization upon a received signal to generate a second equalized signal as the data signal.

20. The sequence detection method of claim 18, further comprising:

dynamically activating the sequence detection.

\* \* \* \* \*